(12) United States Patent
Furxhi et al.

(10) Patent No.: US 12,204,025 B2
(45) Date of Patent: Jan. 21, 2025

(54) METHOD AND A DEVICE FOR DETERMINING A DISTANCE TO A TARGET (71) Applicant: IMEC VZW, Leuven (BE)

(72) Inventors: Orges Furxhi, Fort Collins, CO (US); Azhar Din, Cumbernauld (GB); Nikolaos Papadopoulos, Leuven (BE); Jiwon Lee, Herent (BE); Mauricio Velazquez Lopez, Leuven (BE)

(73) Assignee: IMEC VZW, Leuven (BE)

( * ) Notice: Subject to any disclaimer, the term of this patent is extended or adjusted under 35 U.S.C. 154(b) by 125 days.

(21) Appl. No.: 17/878,148

(22) Filed: Aug. 1, 2022

(65) Prior Publication Data

US 2024/0036199 A1  Feb. 1, 2024

(51) Int. Cl.
*G01S 17/32* (2020.01)
*G06F 7/02* (2006.01)

(52) U.S. Cl.
CPC ............. *G01S 17/32* (2013.01); *G06F 7/02* (2013.01)

(58) Field of Classification Search
CPC ........ G01S 17/32; G01S 17/34; G01S 7/4913; G01S 7/4915; G06F 7/02; A01D 41/12; A01D 69/00; F01N 2570/14; F01N 2590/08; F01N 2610/02; F01N 2610/14; F01N 3/2066; G06Q 10/047; G06Q 10/0633; G06Q 10/06395; Y02T 10/12
USPC .......................................................... 356/3
See application file for complete search history.

(56) References Cited

U.S. PATENT DOCUMENTS

| | | | |
|---|---|---|---|
| 4,654,814 A | 3/1987 | Sebald et al. | |
| 4,813,006 A | 3/1989 | Burns et al. | |
| 5,194,870 A | 3/1993 | Pearce et al. | |
| 9,660,623 B1 | 5/2017 | Prokop et al. | |
| 2004/0071200 A1 | 4/2004 | Betz et al. | |
| 2015/0198707 A1* | 7/2015 | Al-Alusi ............... | G01S 13/103 342/127 |

(Continued)

FOREIGN PATENT DOCUMENTS

DE  102013002683 A1  8/2014
DE  102016217838 A1  3/2018

OTHER PUBLICATIONS

Bhargava et al., "Fully Integrated Coherent LiDAR in 3D-Integrated Silicon Photonics/65nm CMOS", 2019 Symposium on VLSI Circuits, Digest of Technical Papers, pp. C262-C263.

(Continued)

*Primary Examiner* — Tri T Ton
(74) *Attorney, Agent, or Firm* — MOSER TABOADA (57) ABSTRACT

A method for determining a distance to a target comprises: receiving a bitstream of binary digits corresponding to a time-varying signal based on light transmitted by a light source being reflected by the target, wherein each binary digit in the bitstream is defined based on the time-varying signal at a time instance represented by the binary digit being above or below a threshold; comparing the bitstream to a set of stored reference bitstreams, wherein the set comprises pairs comprising a first reference bitstream and a second reference bitstream representing a common distance (Continued)

to the target, wherein the first reference bitstream is phase-shifted in relation to the second reference bitstream; and determining the distance to the target based on selection of a pair of reference bitstreams based on said comparing.

14 Claims, 2 Drawing Sheets

(56) References Cited

U.S. PATENT DOCUMENTS

2021/0072382 A1     3/2021    Kashmiri
2022/0003854 A1     1/2022    DeLaus et al.

OTHER PUBLICATIONS

Rogers et al., "A universal 3D imaging sensor on a silicon photonics platform", Nature, vol. 590, 2021, pp. 256-261.

Nakahira et al., "Distance Measurement by an Ultrasonic System Based on a Digital Polarity Correlator", IEEE Transactions on Instrumentation and Measurement, vol. 50, No. 6, 2001, pp. 1748-1752.

Betz et al., "DirAc: An integrated Circuit for Direct Acquisition of the M-Code Signal", MITRE Corporation, 2004, pp. 1-11.

Guermandi et al., "A 79-GHz 2 x 2 MIMO PMCW Radar SoC in 28-nm CMOS", IEEE Journal of Solid-State Circuits, vol. 52, No. 10, 2017, pp. 2613-2626.

Ramesh et al., "The 1024 channel digital correlator receiver of the Gauribidanur radioheliograph", Exp Astron, vol. 21, 2006, pp. 31-40.

Croce et al.,, "Cardinal Interpolation Technique for Nearly Minimum Redundant Matched Filter Bank Detection of Unknown Inspiraling Binary Chirps", The Ninth Marcel Grossman Meeting, 2002, pp. 1911-1912.

Extended European Search Report for Application No. 23187744.0 dated Dec. 13, 2023.

Levinson, et al: "Binary Discrete Fourier Transform and its Inversion", Numerical Analysis, arXiv: 2011.10130v2, pp. 1-16, Oct. 3, 2021.

MathWorks: "Phase shift correction between 2 signals using cross-correlation", https://link.edgepilot.com/s/c99786d0/SqHr_1ITOmvogrgCEz5iA?u=https://www.mathworks.com/matlabcentral/answers/179098-phase-shift-correction-between-2-signals-using-cross-correlation, Feb. 18, 2015, accessed on Aug. 13, 2024.

Wikipedia: "XOR gate", https://link.edgepilot.com/s/f27b43d1/yMlbd3eZ_E2lhkRm1XIVjw?u=https://en/.Wikipedia.org/w/index.php?title=XOR_gate&direction=oldid=1086776291, revision of Nov. 21, 2021, accessed on Aug. 13, 2024.

Texas Instruments: "Time-of-Flight Camera—An Introduction", Technical White Paper, SLOA190B, pp. 1-10, Jan. 2014, Revised May 2014.

Extended European Search Report for Application No. 23187747.3 dated Dec. 12, 2023, 10 pages.

\* cited by examiner

Fig. 3

METHOD AND A DEVICE FOR DETERMINING A DISTANCE TO A TARGET

TECHNICAL FIELD

The present inventive concept relates to a method and a device for determining a distance to a target. In particular, the present inventive concept relates to a method and a device for determining the distance to the target based on the target reflecting light transmitted by a light source.

BACKGROUND

Light detection and ranging (Lidar) is used in many applications wherein range of targets is of interest. Lidar is an active imaging technology wherein light is transmitted from a light source and light reflected by target(s) is detected. Lidar may thus be used to detect presence of targets and a distance to such targets.

The light transmitted by the light source will need to propagate to the target and back to a detector. Thus, Lidar involves a propagation time for the light, which may affect resolution of the imaging technology when a beam of light is scanned over a field of view. Thus, if it is desired to image a large field of view very quickly, parallelism is required in order to improve resolution of Lidar technology. Thus, at least portions of the field of view should be illuminated and detected simultaneously.

Processing of measurement data in Lidar technology may require large processing power. For instance, for frequency modulated continuous wave (FMCW) Lidar, a digital signal may be analyzed using Digital Fourier Transform (DFT) in order to determine the distance to target(s). However, DFT is associated with processing of large data rates and result in complex systems requiring large processing power.

Therefore, there is a need for a more efficient processing of measurement data for determining a distance to a target.

SUMMARY

An objective of the present inventive concept is to provide fast processing of data representing detection of light transmitted by a light source being reflected by a target.

This and other objectives are at least partly met by the invention as defined in the independent claims. Preferred embodiments are set out in the dependent claims.

According to a first aspect, there is provided a method for determining a distance to a target, said method comprising: receiving a bitstream of binary digits corresponding to a variation in time of a time-varying signal based on light transmitted by a light source being reflected by the target, wherein each binary digit in the bitstream is defined based on the time-varying signal at a time instance represented by the binary digit being above or below a threshold; comparing the bitstream of binary digits to a set of stored reference bitstreams of binary digits, wherein each reference bitstream represents a distance to the target and wherein the set of stored reference bitstreams comprise pairs of reference bitstreams comprising a first reference bitstream and a second reference bitstream representing a common distance to the target, wherein the first reference bitstream is phase-shifted in relation to the second reference bitstream, and determining the distance to the target based on selection of a pair of reference bitstreams among the pairs of reference bitstreams based on said comparing.

According to the first aspect, a bitstream of binary digits is used, wherein each binary digit represents a detected signal being above or below a threshold. Thus, a detected signal obtained for detecting light reflected by the target is represented by a stream of binary digits (zeros and ones) in accordance with variation of the signal over time. Each binary digit may thus represent a value of the detected signal being above or below the threshold to form a representation of the time-varying signal. Each binary digit may further represent a value of the time-varying signal at a mutually unique time instance.

It is an insight of the present invention that such a bitstream may provide a unique signature in dependence of a distance to a target. For instance, when using frequency modulated continuous wave (FMCW) light detection and ranging (Lidar), a chirp may be transmitted by the light source wherein a frequency of the transmitted signal varies during the chirp. In such case, a reflected signal from the target may be mixed with the transmitted signal and a frequency shift of the reflected signal and the transmitted signal corresponds to a time for propagating the transmitted signal to and from the target (i.e., corresponding to the distance from the light source to the target). This implies that the time-varying signal may be based on mixing of the light transmitted by the light source and light reflected by the target and may comprise a frequency which represents the distance to the target. Frequency content of the bitstream may thus form a unique signature of the time-varying signal which represents the distance to the target.

Thanks to using a set of stored reference bitstreams, the received bitstream may be directly matched to the set of stored reference bitstreams in order to determine the distance to the target. For instance, the pair of stored reference bitstreams best matching the received bitstream may be determined, whereby the distance to the target associated with the best matching pair of reference bitstreams may be used as a determination of the distance to the target.

This implies that the received bitstream of binary digits may simply be compared to a set of stored reference bitstreams in order to determine the distance to the target. Thus, determining of the distance to the target does not require complex processing of a detected signal. For instance, no Fourier transformation of the detected signal is necessary. Rather, binary digits may be compared to each other which is a very simple operation.

Thanks to the method, distances to targets may be determined with high resolution. When distances to targets are to be determined with high resolution, an amount of data for representing the light reflected by targets becomes large. Thanks to avoiding any Fourier transformation, the method enables processing of data for determining the distance to targets with high resolution for a large range of distances.

The method allows processing of data representing a large volume in which targets may be placed with high spatial resolution (i.e., a large field of view for a large range of distances with a high spatial resolution). Also or alternatively, the method allows processing of data with a high frame rate (i.e., determination of distances to targets in a volume of interest may be updated at a high rate).

Thus, instead of performing advanced analysis of a detected signal, the detected signal is represented as a bitstream of binary digits which may be easily compared to reference bitstreams. Hence, memory is needed for storing the reference bitstreams providing the benefit of greatly reducing processing resources for determining the distance to target(s).

The number of reference bitstreams is dependent on a resolution at which the distance to targets is to be determined and a range of possible distances to targets. Thus, if a high resolution and a large range of distances is required, the number of reference bitstreams may be relatively large. Nevertheless, memory resources required for storing the reference bitstreams are still small in comparison to the processing power saved by not requiring advanced analysis, such as Fourier transformation, of the detected signal.

It is realized that the time-varying signal represented by the received bitstream may not be in phase with a corresponding time-varying signal represented by a reference bitstream. This implies that the comparison between the received bitstream and the reference bitstream may indicate a poor matching between the received bitstream and the reference bitstream representing a correct distance to the target. According to the first aspect, the set of reference bitstreams comprises pairs of reference bitstreams, wherein the reference bitstreams within a pair represent different phase-shifts of the reference bitstream to the received bitstream. Thus, by comparing the received bitstream to the reference bitstreams in a pair, the similarity of the received bitstream to the reference bitstreams may be determined for different phase relations between signals represented by the received bitstream and the reference bitstreams. This implies that a matching value for the received bitstream to the pair of reference bitstreams may be immediately determined by comparing the received bitstream to each of the reference bitstreams in the pair.

Thus, thanks to using pairs of reference bitstreams, wherein the reference bitstreams in a pair represent a common distance to the target, the correct distance to the target may be quickly determined by the received bitstream being compared to the pairs of reference bitstreams and need not be affected by the received bitstream not being in phase with reference bitstreams. The received bitstream may be simultaneously compared to all the reference bitstreams in all pairs of reference bitstreams whereby matching values relating the received bitstream to respective pairs of reference bitstreams may be obtained such that the distance to the target may be quickly determined. The comparing of the received bitstream to the first reference bitstream and the second bitstream in a pair of reference bitstreams may thus take into account phase shift between the received bitstream and the first and second reference bitstreams such that no further processing of the received bitstream is required in relation to the reference bitstreams in order to handle phase relations.

The bitstream of binary digits may be received by a processing unit (implemented in hardware/software or a combination thereof) which is directly connected to a detector for detecting the time-varying signal. However, according to an alternative, the bitstream of binary digits may be received by a unit which is external to the detector. Thus, the method may be performed externally to the detector. Since each time instance of the detected signal may be represented by a single binary digit, an amount of data needed to be transmitted from the detector is relatively small enabling the method to be implemented externally to the detector.

Comparing of the bitstream of binary digits to a set of stored reference bitstreams implies that bitstreams are compared in order to find a pair of reference bitstreams that matches the received bitstream of binary digits. The bitstreams being compared may involve that presence of sequences of bits in the bitstream is identified or that the binary digits are compared bit by bit in order to identify how many bits are the same in the received bitstream and the reference bitstream.

Comparing of the bitstream of binary digits to a set of stored reference bitstreams may imply that the received bitstream is compared to each of the stored bitstreams. However, it should be realized that the received bitstream may be compared only to a subset of the stored reference bitstreams. For instance, if a target has been determined to be at a particular range in a first frame, the received bitstream for a subsequent frame may be compared only to reference bitstreams around the particular range previously determined.

One or more pairs of reference bitstreams may be selected based on the comparing of the received bitstream to the set of stored reference bitstreams. The pair(s) of reference bitstreams may be selected based on a matching value, determined by the comparing, representing how well the pair of reference bitstream matches the received bitstream, such as by selecting the pair(s) of reference bitstreams having a highest matching value.

Since each pair of reference bitstreams represents a particular distance to the target, the distance to the target may be determined based on selected pair(s) of reference bitstreams. For instance, if one pair of reference bitstreams is selected, the distance to the target may be simply determined as being the distance represented by the pair. If several pairs of reference bitstreams are selected, the distance to the target may be determined based on processing of the distances represented by the selected pairs, such as forming an average based on the distances represented by the selected pairs.

As used herein, the distance to a target corresponds to a distance between an output and the target, wherein the output may be a transmitter for outputting light towards the target. The reflected light from the target may be collected at an input, such as a receiver. The input and the output may be arranged at a common distance from the target.

It should be realized that additional reference bitstream(s) may be associated with each pair of reference bitstreams, such that more than two reference bitstreams represent a common distance to the target. Such additional reference bitstream(s) may be phase-shifted in relation to the first and second reference bitstream. Information of comparing of the received bitstream to the additional reference bitstream(s) may be used for selection of the pair of reference bitstreams.

The phase shift between the first reference bitstream and the second reference bitstream may be equal for each pair of reference bitstreams. The phase shift may be sufficiently large such that regardless of phase of the received bitstream, the comparing of the received bitstream to pairs of reference bitstreams may return a correct pair of reference bitstreams as being a best match to the received bitstream. For instance, a phase shift between the first reference bitstream and the second reference bitstream may be at least 45°, such as 90° corresponding to representing the reference bitstream as in-phase and quadrature components.

According to an embodiment, the first reference bitstream has a 90 degree phase shift to the second reference bitstream in relation to a frequency of the time-varying signal represented by the pair of reference bitstreams.

It should be realized that different pairs of reference bitstreams may represent time-varying signals having different frequencies. This implies that even if a common a phase shift between the first reference bitstream and the second reference bitstream is used in each pair, a time relation between the first reference bitstream and the second reference bitstream within a pair will be different for different pairs.

According to an embodiment, the method further comprises detecting light transmitted by the light source being reflected by the target to form a detected signal and comparing the detected signal to a threshold for converting the detected signal to a binary digit.

The bitstream of binary digits may be generated by detecting a detected signal and comparing the detected signal to the threshold at a plurality of time instances, wherein the detected signal forms the time-varying signal. Thus, the method is further able to generate the bitstream of binary digits.

The bitstream of binary digits may be generated by a detector and a processing unit (which may be implemented in hardware, software, or a combination thereof) may be configured to receive the bitstream of binary digits from the detector.

According to an embodiment, light being reflected by the target is mixed with light transmitted by the light source to form a mixed light signal and wherein detecting light comprises detecting the mixed light signal.

Thus, the time-varying signal being based on light being reflected by the target may imply that the mixed light signal is detected. However, it should be realized that, in other embodiments, the reflected light signal may be directly detected forming the time-varying signal.

Thanks to using a mixed light signal, the time-varying signal may represent a difference in frequency between the light transmitted by the light source and the light reflected by the target. Thus, the time-varying signal may have a varying signal that varies with a frequency corresponding to the difference in frequency between the light transmitted by the light source and the light reflected by the target.

According to an embodiment, the light transmitted by the light source is a frequency modulated continuous wave, FMCW, signal comprising chirps during which frequency of the FMCW signal is increased.

Thanks to using a FMCW signal comprising chirps, the frequency of light transmitted by the light source will vary with time. This implies that a frequency relation between light transmitted by the light source and light having propagated to a target and back depends on a distance to the target. Hence, by determining the frequency of the mixed signal, the distance to the target may be determined.

The frequency of the FMCW signal may be monotonically increased with a constant rate of increasing the frequency during the chirp. Between chirps, the frequency may be reset to an initial value used at start of the next chirp.

According to an embodiment, an output from comparing the detected signal to the threshold is periodically sampled for forming the bitstream of binary digits.

Thus, the detected signal may be converted to a digital representation, wherein one binary digit represents one sample of the detected signal. Thus, the bitstream of binary digits will represent a sequence of samples.

According to an embodiment, the comparing the bitstream of binary digits to a set of stored reference bitstreams of binary digits comprises determining a matching value for each stored reference bitstream based on bit-wise comparison, wherein the matching value represents similarity between the bitstream of binary digits and the stored reference bitstream, and wherein the bit-wise comparison comprises comparing the binary digits of the bitstream and the stored reference bitstream at corresponding positions and increasing the matching value when the binary digits are equal.

Thus, the received bitstream and the reference bitstream may be compared by comparing the bits at corresponding positions of the bitstream. The bit at a position 1 in the received bitstream is compared to the bit at position 1 in the reference bitstream, the bit at position 2 in the received bitstream is compared to the bit at position 2 in the reference bitstream and so forth. If the compared bits at a position are equal, i.e., if both bits are zero or if both bits are one, the received bitstream and the stored bitstream match at the position.

The bit-wise comparison may generate a matching value which represents the similarity between the received bitstream and the stored reference bitstream. The matching value may be determined as a combination, such as a sum, of a result of each individual bit-wise comparison. Thus, if the bits at a position match, a value of "1" may be added to the matching value. Also, if the bits at a position do not match, a value of "1" may be subtracted from the matching value.

It should be realized that the matching value may be determined in numerous other ways as a combination of the result of the bit-wise comparisons.

The determined matching value may thus take into account each bit of the received bitstream and the stored reference bitstream for forming the matching value. Thus, the matching value may represent the similarity for the entire received bitstream and the stored reference bitstream. Hence, using a longer bitstream allows determination of the best matching reference bitstream among the set of reference bitstreams with high accuracy.

The individual bit-wise comparison may be easily and quickly performed since it only requires comparing the value of two individual bits. For instance, if implemented in hardware, the bit-wise comparison may be performed by a simple XNOR-gate. Each of the bits of the received bitstream may also be simultaneously compared to the corresponding bits of the reference bitstreams, e.g., by using a plurality of XNOR gates each dedicated to comparing the bits at a respective position in the bitstreams. Alternatively, the bits of the received bitstream may be sequentially compared to the corresponding bits of the reference bitstreams and the bits may be compared as soon as being generated by periodical sampling of the output from comparing the detected signal to the threshold.

According to an embodiment, the comparing the bitstream of binary digits to a set of stored reference bitstreams comprises parallel processing of the comparing of the bitstream of binary digits to each of the stored reference bitstreams.

Since the bit-wise comparison may be performed quickly and, if implemented in hardware, by simple circuitry, the parallel processing may not require extensive processing resources. Thus, it is possible to perform parallel processing without requiring extensive processing resources.

Thanks to using parallel processing of comparing of the received bitstream to the stored reference bitstreams, determination of the reference bitstream(s) to be selected for determining the distance to the target may be performed very quickly. This facilitates determining the distance to the target at a high frame rate.

According to an embodiment, for each stored reference bitstream, determining the matching value comprises determining a first partial matching value to the bitstream of binary digits based on a first light signal transmitted by a light source being reflected by the target using said bit-wise comparison, storing the first partial matching value, determining a second partial matching value to the bitstream of binary digits based on a second light signal transmitted by a light source being reflected by the target using said bit-wise comparison, and accumulating the first partial matching value with the second partial matching value to form the matching value.

This implies that the determination of the distance to the target may use information integrated from a plurality of light signals transmitted by the light source. For instance, a plurality of FMCW signal chirps may be used and information obtained from different chirps may be integrated in determining the distance to the target.

Thanks to using information integrated from a plurality of light signals, the distance to the target may be determined with a higher accuracy.

It should be realized that an exact phase relation between the received bitstream and the reference bitstreams is not determined. Also, a phase relation between a first received bitstream based on the first light signal and a second received bitstream based on the second light signal may not be known. However, thanks to the use of pairs of reference bitstreams allowing phase shifts between the received bitstream and the reference bitstreams to be taken into account, information integrated from a plurality of light signals may be positively accumulated such that accuracy of selecting a correct pair of reference bitstreams is improved by using information form a plurality of light signals.

According to an embodiment, the first partial matching value is accumulated with the second partial matching value using a L1 norm.

Accumulation of partial matching values using the L1 norm may be quickly computed. Thus, use of the L1 norm may be suitable for providing fast computation of the matching value based on the first and second partial matching values.

However, it should be realized that the first partial matching value may be accumulated with the second partial matching value in other manners. For instance, the first partial matching value may be accumulated with the second partial matching value using a L2 norm.

According to an embodiment, determining the distance to the target comprises, for each pair of reference bitstreams, forming a magnitude value representing likelihood of the received bitstream of binary digits corresponding to the common distance to the target represented by the pair of reference bitstreams, wherein the magnitude value is formed based on the matching value for the first reference bitstream and the matching value for the second reference bitstream of the pair.

Thus, the magnitude value may represent a combined matching of the received bitstream to the pair of reference bitstreams. Hence, even if the phase of the received bitstream is counterphase to the first reference bitstream of a correct pair of reference bitstreams, such that the matching value of the received bitstream to the first reference bitstream may be very poor, the matching value of the received bitstream to the second reference bitstream will then be very good. Also, the phase of the received bitstream may not fit to any of the phase of the first bitstream or the phase of the second bitstream, such that the matching value to each of the first reference bitstream and the second reference bitstream may be neither very poor nor very good. Still, a combination of the matching values may allow the pair of reference bitstreams to be identified as a match to the received bitstream. By using the magnitude value that takes into account the matching of the received bitstream to each of the first reference bitstream and the second reference bitstream of the pair, the comparing of the received bitstream to the set of reference bitstreams allows correct pair(s) of reference bitstreams to be selected for determining the distance to the target.

The magnitude value may be formed in numerous different ways based on the matching value for the first reference bitstream and the matching value for the second reference bitstream. For instance, the magnitude value may be determined based on squares of the matching values for the first reference and for the second reference bitstream.

It should be realized that accumulation of partial matching values may be performed for each reference bitstream of a pair. Then, the magnitude value may be determined based on matching values that each involve accumulation of partial matching values. However, according to an alternative when plural light pulses are used, matching values may be determined for each light signal and used for determining partial magnitude values based on the matching values for the first reference bitstream and the second reference bitstream. Then, partial magnitude values may be accumulated in order to provide integration of information from plural light pulses.

According to an embodiment, determining the distance to the target further comprises selecting a plurality of pairs of reference bitstreams having largest magnitude values and forming an interpolation based on the largest magnitude values to determine the distance to the target with an improved resolution.

The magnitude values of pairs of reference bitstreams at neighboring distances to the pair of reference bitstreams having a highest matching value may be relatively large and may comprise further information of the distance to the target. The relation between the magnitude values of the selected plurality of pairs of reference bitstreams may indicate whether the correct distance to the target is at a center distance of a sub-range of distances represented by the pair of reference bitstreams having a largest matching value or is slightly closer or farther away. Hence, by selecting a plurality of pairs of reference bitstreams, the distance to the target may be determined with even higher accuracy.

According to an embodiment, the method further comprises receiving a plurality of bitstreams of binary digits corresponding to spatially separate detections of light, wherein the plurality of bitstreams is processed in parallel.

Thus, targets may be determined in a field of view, wherein separate detections of light may represent different locations in the field of view. Thanks to the limited processing resources required for determining the distance to the target, a plurality of received bitstreams for spatially separated detections of light may be performed in parallel so as to allow distances to target within a field of view to be determined very quickly and allowing a high frame rate for determining distances to targets within the field of view to be used.

According to a second aspect, there is provided a computer program product comprising computer-readable instructions such that when executed on a processing unit the computer program will cause the processing unit to perform the method according to the first aspect.

Effects and features of this second aspect are largely analogous to those described above in connection with the first aspect. Embodiments mentioned in relation to the first aspect are largely compatible with the second aspect.

The computer program product may implement the method in a processing unit, which may be a dedicated processing unit for performing the method or may be a general-purpose processing unit which may be able to perform the method based on the computer program product.

The computer program product may comprise a computer-readable medium on which the computer-readable instructions are stored. The computer program product may thus be provided as a non-transient computer program product stored on any tangible medium. Alternatively, the computer program product may be provided as a signal carrying the computer-readable instructions for allowing the computer program product to be loaded into a memory accessible to the processing unit.

The computer program product may have access to a memory storing the set of reference bitstreams to enable the computer program product to compare the received bitstream to the stored reference bitstreams.

According to a third aspect, there is provided a device for determining a distance to a target, said device comprising: a processor configured for: receiving a bitstream of binary digits corresponding to a variation in time of a time-varying signal based on light transmitted by a light source being reflected by the target, wherein each binary digit in the bitstream is defined based on the time-varying signal at a time instance represented by the binary digit being above or below a threshold; comparing the bitstream of binary digits to a set of stored reference bitstreams of binary digits, wherein each reference bitstream represents a distance to the target and wherein the set of stored reference bitstreams comprise pairs of reference bitstreams comprising a first reference bitstream and a second reference bitstream representing a common distance to the target, wherein the first reference bitstream is phase-shifted in relation to the second reference bitstream, and determining the distance to the target based on selection of a pair of reference bitstreams among the pairs of reference bitstreams based on said comparing.

Effects and features of this third aspect are largely analogous to those described above in connection with the first and second aspects. Embodiments mentioned in relation to the first and second aspects are largely compatible with the third aspect.

The processor may be implemented as a processing unit which may be configured to execute a computer program for determining the distance to the target. Thus, the processing unit may be a general-purpose processing unit provided with a dedicated computer program.

Alternatively, the processor may be implemented as dedicated hardware for determining the distance to the target, such as an Application-Specific Integrated Circuit (ASIC) or a Field-Programmable Gate Array (FPGA), which may be configured to implement functionality for determining the distance to the target.

The device may further comprise a memory storing the set of reference bitstreams and the processor may be configured to have access to the set of reference bitstreams for allowing the processor to compare the received bitstream to the reference bitstreams.

The determining of the distance to the target may be performed with limited requirements on processing resources allowing use of a simple device and/or allowing the distance to the target to be quickly determined.

According to an embodiment, the device further comprises: a light source for transmitting light towards the target; a mixer for mixing light reflected by the target and light transmitted by the light source for forming a mixed light signal; a detector for detecting the mixed light signal; and a comparator for comparing output from the detector to a threshold for converting output from the detector to a binary digit.

Thus, the device further comprises components enabling detecting a signal based on reflected light and forming of the bitstream of binary digits.

The detecting of the mixed light signal may for instance be used for determining distances to targets using FMCW Lidar, wherein a frequency difference between reflected light and light transmitted by the light source is indicative of the distance to the target.

According to an embodiment, the device further comprises a controller for controlling timing of the processor in relation to timing of a signal transmitted by the light source.

Thus, the controller may control timing of signals transmitted by the light source. The signals transmitted by the light source are associated with a time window during which reflected light is expected to reach a detector. Thus, the controller may also control a timing of the processor to ensure that bitstreams of the relevant time window are processed and that the processing accurately determines the distance to the target.

For instance, the controller may control resetting of partial matching values or the matching value associated with each reference bitstream in synchronization with output of a new signal by the light source. Thus, the determining of the distance to the target may properly accumulate information from plural signals and, also, updating of determining of distances to targets will not be affected by previously used matching values.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
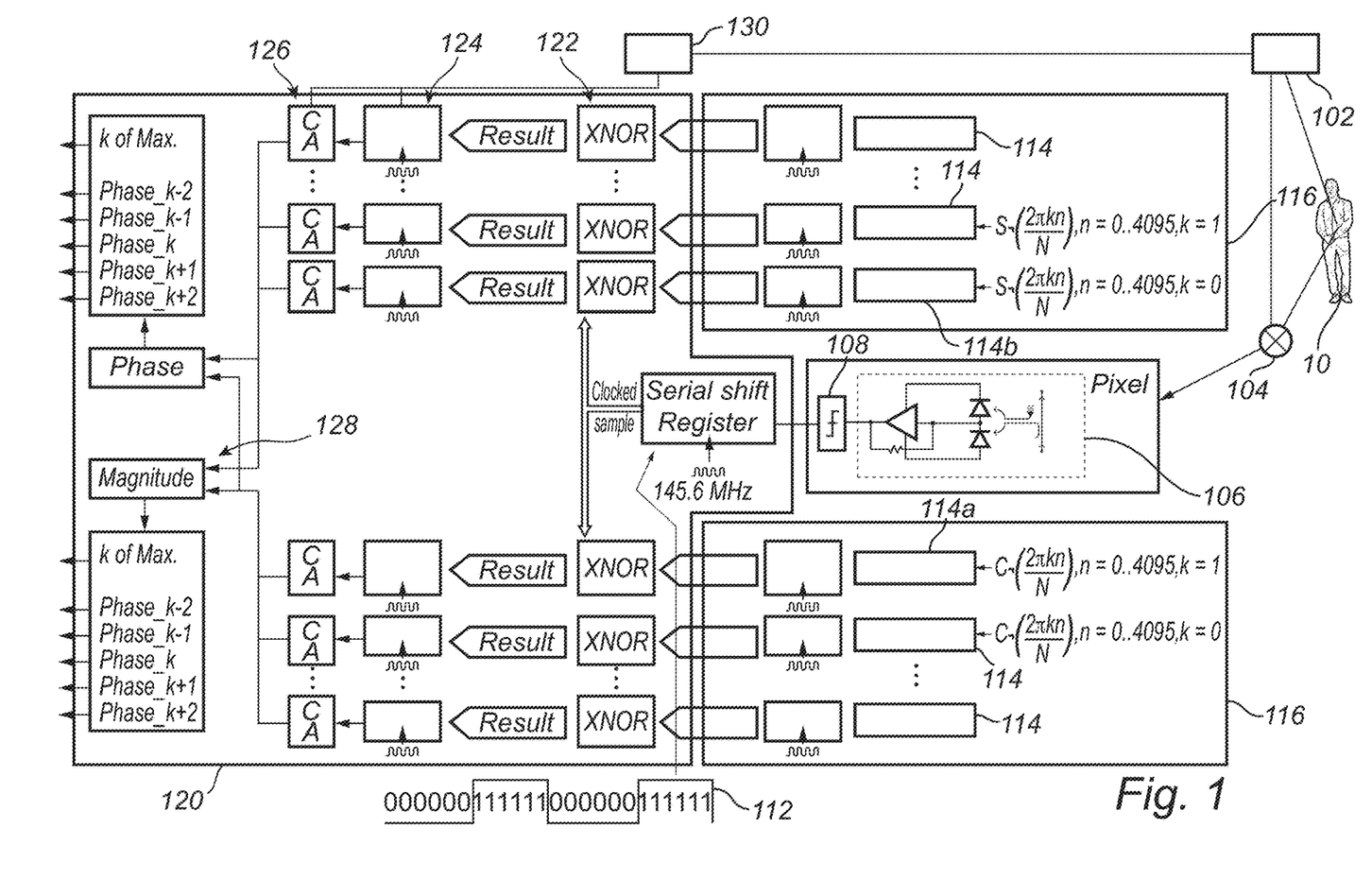
FIG. 1 is a schematic view of a device for determining a distance to a target according to an embodiment.

Referring now to FIG. 1, a device 100 for determining a distance to a target 10 will be described.

The device 100 is configured to process acquired data for determining the distance to the target 10. Thus, the device 100 comprises a processor 120 for processing data. The processor 120 may be arranged separately from a set-up for acquisition of data and may be configured to communicate through wired or wireless communication for receiving data based on which the distance to the target 10 is determined.

In FIG. 1, the device 100 is illustrated as comprising components for acquisition of data. However, it should be realized that these components are not necessarily part of the device 100 which processes acquired data in order to determine the distance to the target 10.

As shown in FIG. 1, the device 100 comprises a light source 102 for transmitting light towards the target 10. The light source 102 may be configured to transmit frequency modulated continuous wave (FMCW) chirps. Thus, the light source 102 may transmit pulses of light having a monotonically changing frequency during the pulse, such as having a frequency which increases linearly with time from a first frequency to a second frequency during the pulse.

The light transmitted from the light source 102 may hit a target 10 and may be reflected back towards the device 100 such that the device 100 uses light detection and ranging (Lidar) for determining the distance to the target 10.

Reflected light from the target 10 may be collected and may be mixed by a mixer 104 for mixing light reflected by the target 10 and light transmitted by the light source 102. The light transmitted by the light source 102 may be immediately passed to the mixer 104, whereas the light reflected by the target 10 has propagated to the target 10 and back. Thus, the reflected light is delayed in relation to the light transmitted by the light source 102 when reaching the mixer 104.

Using FMCW Lidar, the frequency of the reflected light differs from the frequency of the light transmitted by the light source 102 when reaching the mixer 104 and a difference in frequencies is dependent on the distance to the target 10. The light transmitted by the light source 102 and the reflected light may thus be mixed by the mixer 104 for forming a mixed signal which may exhibit an intensity modulation which is varying with a beat frequency corresponding to the difference in frequencies between the light transmitted by the light source 102 and the reflected light. Using chirps wherein the frequency changes linearly with time implies that the beat frequency will be constant during an integration time of acquiring the mixed light signal.

The device 100 further comprises a detector 106 for detecting the mixed light signal. The detector 106 may comprise a photodiode for detecting intensity of the mixed light signal. The detector 106 may be configured to detect a time-varying signal, wherein the time-varying signal exhibits the beat frequency.

The device 100 further comprises a comparator 108 for comparing a detected signal detected by the detector 106 to a threshold. The threshold may be set in relation to a baseline, where the detected signal is configured to provide an alternating current (AC) signal on top of the baseline. For instance, the baseline may be zero, but it should be realized that the baseline may be a different value depending on set-up of the detector 106 as would be appreciated by a person skilled in the art. The comparator 108 may output two different signal levels depending on whether the detected signal is above or below the threshold. Thus, the output from the comparator 108 may correspond to a binary digit representing the detected signal being above or below the threshold.

The output from the comparator 108 may be read into a serial shift register and the reading of binary digits into the serial shift register may be clocked by a sampling signal. Thus, the output from the comparator 108 may be periodically sampled and after sampling of the output from the comparator 108 the serial shift register may store a bitstream 112 of binary digits.

The device 100 may thus implement a method for forming the bitstream 112 of binary digits. The method may comprise transmitting light towards a target 10 and mixing light being reflected by the target 10 with light transmitted by the light source 102 to form a mixed light signal, wherein the light transmitted by the light source is a FMCW signal such that the mixed light signal exhibits a beat frequency corresponding to the difference in frequency between the reflected light and the light transmitted by the light source 102. The method may further comprise detecting a detected signal based on light transmitted by the light source 102 being reflected by the target such as detecting the mixed light signal. The method may further comprise comparing the detected signal to a threshold for converting the detected signal to a binary digit. The method may further comprise periodically sampling an output from comparing the detected signal to the threshold for forming the bitstream 112 of binary digits.

The bitstream 112 of binary digits represents a waveform which is dependent on the beat frequency. Thus, the bitstream 112 of binary digits may have a unique waveform in dependence of the distance to the target 10.

Thanks to the detected signal being represented as the bitstream 112 of binary digits, wherein each binary digit represents a value of the time-varying signal detected by the detector at a respective time instance, the detected signal is represented by a small amount of data while including information of the distance to the target 10.

The bitstream 112 of binary digits may represent the time-varying signal during a time interval, which may correspond to a duration of a chirp or a portion of the duration of the chirp. Using a relatively long bitstream, the distance to the target 10 may be determined with a greater reliability.

According to an illustrative and non-limiting example, a chirp has a duration of approximately 50 μs. In some embodiments, a single chirp may be used in determining the distance to the target 10. In other embodiments, several chirps may be used and the determination of the distance to the target 10 may be based on integration of information from several chirps.

An available duration for a chirp is a function of a number of pixels that are to be detected and a refresh time desired. That is, the reflected light may be detected in a plurality of pixels of an array in order to provide spatial resolution of detecting targets. The refresh time indicates a rate at which the determination of distances to targets 10 is updated. For example, to detect an image array of 320×240 pixels with a refresh time of 20 Hertz, the maximum duration available for each pixel is 1/(320×240×20)=651 ns.

If several pixels may be processed in parallel, the time interval available for each pixel increases by a factor equal to the number of parallel processes. For the example given, if 80 pixels can be detected in parallel (one for every four columns), the available time interval for each pixel increases to 651 ns×80=52.08 μs.

Each chirp may comprise a frequency shift of 1.5 GHz with a center frequency in, for example, a THz range corresponding to infrared light or visible light. This implies that the beat frequency generated by the reflected signal from a target 10 at a distance of 300 m is approximately 65 MHz.

The output from comparing the detected signal to the threshold may be periodically sampled using a sampling frequency of 145.6 MHz, which implies that the beat frequency of interest (if it is desired to detect targets 10 at a distance up to 300 m) is below a Nyquist frequency.

It is realized that if a length of the bitstream 112 is decreased, a smaller amount of memory is required, whereas if a length of the bitstream 112 is increased, the beat frequency in the detected signal may be determined with higher accuracy.

Although the forming of the bitstream 112 of binary digits have been described above in relation to FMCW Lidar, it should be realized that the bitstream 112 of binary digits may be a result of another measurement technology.

The processor 120 is configured to receive the bitstream 112 of binary digits and is configured to process the received bitstream 112 in order to determine the distance to the target 10.

The processor 120 is configured to compare the received bitstream 112 of binary digits to a set of stored reference bitstreams 114 of binary digits. The device 100 may comprise a memory 116 storing the set of reference bitstreams 114. Each of the reference bitstreams 114 may represent a sequence of binary digits corresponding to a waveform formed by light being reflected from the target 10 at a particular distance. The reference bitstreams 114 comprise pairs of reference bitstreams 114 comprising a first reference bitstream 114a and a second reference bitstream 114b representing a common distance to the target 10. The first reference bitstream 114a and the second reference bitstream 114b are phase-shifted in relation to each other based on the beat frequency represented by the pair of reference bitstreams 114. Since different pairs represent different distances to the target 10, different pairs of reference bitstreams 114 will represent different beat frequencies.

The phase-shift between the first reference bitstream 114a and the second reference bitstream 114b may be at least 45° such that comparing of the received bitstream 112 to the pair of reference bitstream 114 will take into account a phase relation between the received bitstream 112 and the first and second reference bitstreams 114a, 114b so as to allow a correct pair of reference bitstreams 114 to be identified for determining the distance to the target 10.

The waveforms depend on the beat frequency formed by the reflected light and the light transmitted by the light source 102. A range of possible distances to targets 10 divided by a resolution for determining the distance provides a number of different beat frequencies that may need to be identified in order to determine the distance to the target 10. This defines a number of beat frequencies of interest. For instance, if the range of possible distances is 300 m and the distance to targets 10 is to be determined with a 10 cm resolution, the number of different beat frequencies is 3000.

The number of reference bitstreams 114 formed should at least correspond to two times a number of beat frequencies of interest (a pair of reference bitstreams 114 for each beat frequency). Each of the pairs of reference bitstreams 114 may represent a waveform of a unique beat frequency. However, in some embodiments, additional reference bitstreams 114 may be used for each beat frequency, wherein the additional reference bitstreams 114 for the same beat frequency represent yet different phase shifts of the waveform of the beat frequency compared to the first reference bitstream 114a and the second reference bitstream 114b.

The processor 120 may be configured to use the comparison of the received bitstream 112 to the set of stored reference bitstreams 114 for identifying and selecting one or more pairs of reference bitstreams 114 matching the received bitstream 112, such as providing a best match to the received bitstream 112.

Each pair of reference bitstreams 114 may be associated with a distance to the target 10. Thus, when selecting a pair of reference bitstreams 114, the processor 120 may be configured to simply determine the distance to the target 10 by determining the distance to the target 10 associated with the selected pair of reference bitstreams 114. However, as explained below, a plurality of pairs of reference bitstreams 114 may be selected and the distance to the target 10 may be determined by further analyzing matching of the received bitstream 112 to the selected pairs of reference bitstreams 114.

According to an embodiment, the processor 120 may be configured to compare the received bitstream 112 to the set of stored reference bitstreams 114 by determining a matching value for the received bitstream 112 in relation to each of the reference bitstreams 114. The matching value may represent a similarity between the received bitstream 112 and the reference bitstream 114. Matching values for the received bitstream 112 to the first reference bitstream 114a and the second reference bitstream 114b, respectively, of a pair may then be used for determining a combined similarity of the received bitstream 112 to the pair of reference bitstreams 114, which combined similarity may be used for selecting a pair of reference bitstreams 114.

The determining of the matching value for the received bitstream 112 in relation to one of the reference bitstreams 114 may be based on bit-wise comparison. Thus, each of the binary digits of the received bitstream 112 is compared to a respective corresponding binary digit of the reference bitstream 114. This implies that the binary digit at position 1 of the received bitstream 112 is compared to the binary digit at position 1 of the reference bitstream 114, the binary digit at position 2 of the received bitstream 112 is compared to the binary digit at position 2 of the reference bitstream 114, and so forth.

When comparing binary digits, a check is made whether the binary digits match (the binary digits being equal, i.e., both are a zero or both are a one) or whether the binary digits do not match (the binary digits differ, i.e., one of the binary digits is zero and another of the binary digits is one). If the binary digits are equal, the received bitstream 112 and the reference bitstream 114 match at that position.

The matching value may be determined as a combined value based on each of the bit-wise comparisons. According to an embodiment, if the binary digits at a position in the received bitstream 112 and the reference bitstream 114 match, a value of "1" may be added to the matching value, whereas if the binary digits at a position in the received bitstream 112 and the reference bitstream 114 do not match, a value of "1" may be subtracted from the matching value.

It should be realized that the matching value may be determined in alternative ways, such as only counting a number of positions at which the received bitstream 112 and the reference bitstream 114 match.

The processor 120 may comprise a comparing module 122 for performing bit-wise comparison of the received bitstream 112 to each of the reference bitstream 114. The comparing module 122 may be implemented in software in order to perform the bit-wise comparison. However, according to an alternative, the comparing module 122 may be implemented in hardware. Each of the bit-wise comparisons may be performed by an XNOR-gate, which compares two binary digits and outputs a result in dependence of whether the binary digits match or not.

The comparing module 122 may be configured to sequentially compare the binary digits of the received bitstream 112 to respective binary digits of the reference bitstream 114. If the comparing module 122 is implemented in hardware, this implies that the comparing module 122 may comprise one XNOR-gate which sequentially compares the binary digits of the received bitstream 112 to the corresponding binary digits of the reference bitstreams 114.

Using XNOR-gates, the value of a bit-wise comparison is "1" if the binary digits match and "0" if the binary digits do not match. The comparing module 122 may simply output a sum of the bit-wise comparisons as the matching value, which will then correspond to a count of the number of positions at which the received bitstream 112 and the reference bitstream 114 match.

The comparing of the received bitstream 112 to the set of stored reference bitstreams 114 may comprise parallel processing of the comparing of the received bitstream 112 to each of the reference bitstreams 114. Thus, the received bitstream 112 may be separately and simultaneously compared to each individual reference bitstream 114.

This may be achieved by the comparing module 122 comprising parallel processes for performing the comparisons. Thus, the received bitstream 112 may be provided to each of the parallel processes, and in each of the parallel processes the received bitstream 112 is compared to a unique reference bitstream 114. For instance, the comparing module 122 may comprise a set of comparing units, wherein each comparing unit is configured to receive the received bitstream 112 and receive one of the reference bitstreams 114, wherein the comparing unit compares the received bitstream 112 to the reference bitstream 114 for determining the matching value. Thus, different comparing units compare the received bitstream 112 to different reference bitstreams 114.

The comparing units may each comprise a XNOR-gate that sequentially compares the binary digits of the received bitstream 112 to the binary digits of respective reference bitstreams 114.

The binary digits of the received bitstream 112 may be clocked to be sequentially provided to the XNOR-gates. Each of the XNOR-gates may thus compare the binary digit of the received bitstream 112 to a binary digit clocked from a memory register storing the respective reference bitstream 114.

The first and second reference bitstreams 114a, 114b of a pair of reference bitstreams 114 may represent sine and cosine waves with a frequency corresponding to the beat frequency. Hence, the reference bitstreams 114 representing a cosine wave may represent an in phase signal (I) and the reference bitstreams 114 representing a sine wave may represent a quadrature phase signal (Q).

The frequencies represented by the reference bitstreams 114a of the I signal is indicated in FIG. 1 as being a cosine wave (C), wherein a phase of the wave in a bit n of the reference bitstream 114a corresponds to:

$$\frac{2\pi kn}{N},$$

where k is different for each reference bitstream 114a and varies from 0 to N for the different reference bitstreams 114a, and N is the number of different pairs of reference bitstreams 114.

Similarly, the frequencies represented by the reference bitstreams 114b of the Q signal is indicated in FIG. 1 as being a sine wave (S), wherein a phase of the wave in a bit n of the reference bitstream 114b corresponds to:

$$\frac{2\pi kn}{N},$$

where k is different for each reference bitstream 114b and varies from 0 to N for the different reference bitstreams 114b, and N is the number of different pairs of reference bitstreams 114.

The memory registers may be programmable and may comprise loop pointers. The loop pointer is programmable and may be used to set a periodicity of the waveform represented by the reference bitstream 114 in the memory register. Although the register may comprise a large number of bits, once the loop pointer is reached, a clocked bit pointer may point back at a beginning of the memory register so that a sequence of binary digits of the reference bitstream 114 is repeated and may be compared to further binary digits of the received bitstream 112. Thus, a large number of binary digits of the received bitstream 112 may be used for comparison to the reference bitstreams 114. This enables integrating information in a large number of binary digits of the received bitstream 112 in order to improve accuracy of the comparison of the received bitstream 112 to the pairs of reference bitstreams 114 in correctly identifying the pair of reference bitstreams 114 that represent a correct distance to the target 10.

Results from the XNOR gates may be provided to a combining module 124, which combines the result of the comparison of each binary digit of the received bitstream 112 to corresponding binary digits of the reference bitstreams 114. Thus, the combining module 124 may provide integration of individual results of bit-wise comparison. The combining module 124 may comprise a plurality of combining units, each connected to the respective XNOR-gate of a comparing unit.

According to an embodiment, each combining unit may be configured as a clocked V adder. The V adder may be clocked in synchronization with clocks for inputting binary digits to the XNOR-gate such that the V adder reads in a result for each individual bit-wise comparison from the XNOR-gate. The V adder may be configured to treat a "1" from the XNOR-gate as a positive accumulation (increment) and a "0" from the XNOR-gate as a negative accumulation (decrement). An operation of the V adder may be described as:

$$\bigvee_{n=0}^{N-1} z\neg(n) = \sum_{n=0}^{N-1} Z(n) \text{ where } \begin{cases} Z(n) = 1 \text{ if } z\neg(n) = 1 \\ Z(n) = -1 \text{ if } z\neg(n) = 0 \end{cases}$$

where z¬(n) is the output of the XNOR-gate at a $n^{th}$ clock and N is the number of bit-wise comparisons performed.

The V adder may receive signal(s) for resetting the V adder and for stopping accumulation by the V adder. The V adder may be reset in synchronization with a start of a chirp of the light transmitted by the light source 102. The accumulation by the V adder may be stopped at end of the chirp. An accumulated value of the V adder, which may be positive or negative, provides a matching value of the received bitstream 112 to the reference bitstream 114.

The matching value of the V adder may be used as a measure of similarity of the received bitstream 112 to the reference bitstream 114. These measures for the similarity of the received bitstream 112 to the first reference bitstream 114a and the second reference bitstream 114b of a pair may be combined in order to determine a similarity of the received bitstream 112 to the pair of reference bitstreams, as will be discussed below.

However, according to an embodiment, the determining of the distance to the target 10 may involve use of a plurality of signals transmitted by the light source 102. Thus, the light source 102 may be used for transmitting at least a first chirp signal and a second chirp signal and the received bitstream 112 may comprise a first portion based on the first chirp signal and a second portion based on the second chirp signal.

The processing unit 120 may be configured to determine a first partial matching value to the first portion of the received bitstream 112 based on the first chirp signal and a second partial matching value to the second portion of the received bitstream 112 based on the second chirp signal. The processing unit 120 may further be configured to accumulate the first partial matching and the second partial matching value to form the matching value of the received bitstream 112 to the reference bitstream 114. It should be realized that additional portions of the received bitstream 112 based on additional chirp signals may be used for further accumulation in forming the matching value.

This implies that the comparing of the received bitstream 112 to the reference bitstreams 114 may be integrated based on a plurality of signals transmitted by the light source 102.

The processing unit 120 may comprise an accumulation module 126, which may comprise a plurality of accumulation units (denoted CA—Compute & Accumulate), which may each be configured to accumulate the partial matching values comparing the received bitstream 112 to a respective reference bitstream 114 into a matching value for the reference bitstream 114.

The accumulation module 126 may be reset in accordance with a number of chirp signals that are to be integrated. Each accumulation unit may be configured to accumulate the partial matching values from a respective V adder.

It should be noted that the phase shift between the received bitstream 112 and the reference bitstream 114 may not be the same for the first and second portion of the received bitstream 112. This implies that the partial matching values from the V adder for an individual reference bitstream 114 may counteract each other. However, thanks to the received bitstream 112 being compared to a pair of reference bitstreams 114, the comparing of the received bitstream 112 for plural chirp signals to the reference bitstreams 114 allows selection of a pair of reference bitstreams 114 with greater accuracy.

According to an embodiment, the partial matching values are accumulated using a L2 norm. Thus, the accumulation module 126 may be configured to compute matching values for a pair of reference bitstreams 114 as:

$$CA_{out\ I} = \sum_{chirps} (I^2_{VAdder}),$$

and $$CA_{out\ Q} = \sum_{chirps} (Q^2_{VAdder})$$

where $CA_{out\ I}$ is the accumulated matching value for the first reference bitstream 114a (I channel) of a pair and $CA_{out\ Q}$ is the accumulated matching value for the second reference bitstream 114b (Q channel) of the pair, $I_{V\ adder}$ is the partial matching value of the V adder for the first reference bitstream 114a and $Q_{V\ Adder}$ is the partial matching value of the V adder for the second reference bitstream 114b.

According to another embodiment, the partial matching values are accumulated using a L1 norm. This may be simpler than using the L2 norm as it is not required to perform a square operation. Thus, the accumulation module 126 may be configured to compute matching values for a pair of reference bitstreams 114 as:

$$CA_{out\ I} = \sum_{chirps} (|I_{VAdder}|),$$

and $$CA_{out\ Q} = \sum_{chirps} (|Q_{VAdder}|).$$

The matching values for the first reference bitstream 114a and the second reference bitstream 114b in a pair may be combined in a selector 128 in order to form a magnitude value which represents a combined similarity of the received bitstream 112 in relation to the reference bitstreams 114a, 114b of the pair. This implies that, even though the received bitstream 112 may differ from one of the reference bitstreams 114 in the pair due to a large phase shift between the received bitstream 112 and the reference bitstream 114, the magnitude value representing a combined similarity may still be able to correctly identify the pair of reference bitstreams 114 among the set of reference bitstreams 114 such that the distance to the target may be correctly determined.

The magnitude value may be formed based on the matching value for the first reference bitstream 114a and the matching value for the second reference bitstream 114b of the pair. The magnitude value may be determined based on matching values that are accumulated for plural partial matching values. By performing calculation of the magnitude value after accumulation of the partial matching values, complexity is reduced as the magnitude value need only be calculated after accumulation is complete.

The magnitude value may for instance be determined as an average of the matching values. According to an embodiment, the magnitude value may be determined as:

$$\text{Magnitude} = \sqrt{(CA_{outI})^2 + (CA_{outQ})^2}.$$

Thus, if an L2 norm is used for accumulation of the partial matching values, the magnitude value becomes:

$$\text{Magnitude} = \sqrt{\left(\sum_{chirps}(I^2_{VAdder})\right)^2 + \left(\sum_{chirps}(Q^2_{VAdder})\right)^2}.$$

If an L1 norm is instead used for accumulation of the partial matching values, the magnitude value becomes:

$$\text{Magnitude} = \sqrt{\left(\sum_{chirps}(|I_{VAdder}|)\right)^2 + \left(\sum_{chirps}(|Q_{VAdder}|)\right)^2}.$$

The distance to the target being determined may comprise selecting a pair of reference bitstreams 114 among the set of reference bitstreams 114 based on comparing the magnitude values for the pairs of reference bitstreams 114 to each other.

The selector 128 may determine the magnitude values based on the matching values from each of the accumulation units of the accumulation module 126 (or directly from the combining units of the combining module 124 if no integration over a plurality of chirps is used). The selector may further determine which of the magnitude values is largest. This may be used for selecting and identifying the pair of reference bitstreams 114 that is associated with the largest magnitude value. Since the pair of reference bitstreams 114 represents a waveform that corresponds to a particular distance to the target 10, the distance to the target 10 may thus be determined as the distance associated with the identified pair of reference bitstreams 114.

The distance to the target being determined may further comprise selecting a plurality of pairs of reference bitstreams 114 having largest magnitude values and forming an interpolation based on the largest magnitude values to determine the distance to the target 10 with an improved resolution. As indicated in FIG. 1, the selector 128 may output an index indicating the pair of reference bitstreams 114 having the largest magnitude value and the selector 128 may further output the determined magnitude value for the selected pair, $Mag_k$, and the determined magnitude value for pairs of reference bitstreams around the selected pair, $Mag_{k-2}$, $Mag_{k-1}$, $Mag_{k+1}$, $Mag_{k+2}$.

Figure 2:
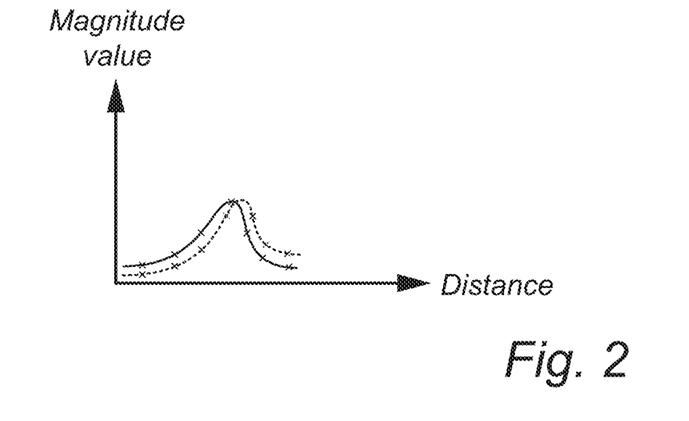
FIG. 2 is a schematic view illustrating interpolation for determining the distance to the target with improved resolution.

As illustrated in FIG. 2, the magnitude values for a plurality of pairs of reference bitstreams 114 around the pair of reference bitstream 114 having a largest magnitude value may be used for plotting a curve of magnitude values as function of distance. Each of the magnitude values for a pair of reference bitstreams 114 may represent a point on the curve corresponding to a particular distance to the target 10. Thus, by selecting a plurality of pairs of reference bitstreams 114, the curve of magnitude values as function of distance may be estimated. Depending on the magnitude values, a peak of the curve may be slightly shifted as illustrated by the dashed and straight lines in FIG. 2, such that the distance to the target 10 may be determined with a higher resolution than the resolution provided by the number of pairs of reference bitstreams 114 used.

Referring again to FIG. 1, the selector 128 may further be configured to determine a phase of the received bitstream 112 based on the matching values of the first reference bitstream 114a and the second reference bitstream 114b of the selected pair of reference bitstreams 114. Where the first and second reference bitstreams 114a, 114b represent I and Q signals with a 90° phase offset to each other, the phase may be determined as arctangent of a ratio of the matching values for the I signal and the Q signal.

For instance, if two consecutive chirps are transmitted by the light source 102 and separated by a specific time period, the phase difference between phases determined for the consecutive chirps may be used for determining a velocity of the target.

The device 100 may further comprise a controller 130 for controlling components of the device 100. The controller 130 may be configured to control timing of output of chirp pulses by the light source 102. The controller 130 may further be configured to control the frequency in the chirp. The controller 130 may further be configured to control a timing and reset of the detector 106. The controller 130 may further be configured to control the processor 120 to at least reset the matching values stored for reference bitstreams 114. The controller 130 may be configured to reset the values of the V adders at start of each chirp. The controller 130 may further be configured to reset the accumulation module 126 in accordance with a number of chirp signals that are to be integrated. Thus, the controller 130 may be configured to synchronize the components of the device 100, such as controlling timing of the processor 120 in relation to timing of a signal transmitted by the light source 102.

The processing of the received bitstream 112 discussed above relates to processing of the received bitstream 112 formed by the detected signal of a single pixel. It should be realized that a plurality of pixels may be used for detecting targets in a field of view. Thus, bitstreams 112 may be formed for each of the pixels.

A plurality of bitstreams 112 may be received and processed in parallel. Thus, the processor 120 may be configured with parallel processing parts, which may each be implemented as discussed above, for processing a respective bitstream 112 for determining the distance to target 10. It should be realized that a plurality of bitstreams 112 may be processed in parallel corresponding to a sub-set of pixels. Hence, sub-sets of pixels may be sequentially analyzed for determining the distance to targets 10 within the entire field of view.

The processor 120 described above may be implemented as a general-purpose processing unit, such as a central processing unit (CPU), which may execute the instructions of one or more computer programs in order to process the received bitstream 112 and to determine the distance to the target 10. Hence, a computer program product may be provided, which provides computer-readable instructions for causing the processor 120 to perform the processing. The computer program product may be provided as a signal carrying the computer program product for allowing the computer program product to be loaded into a memory accessible to the processor 120. According to an embodiment, the computer program product may be provided as a non-transient computer program product stored on any tangible media.

The processor 120 may alternatively be implemented as firmware arranged e.g., in an embedded system, or as a specifically designed processing unit, such as an Application-Specific Integrated Circuit (ASIC) or a Field-Programmable Gate Array (FPGA), which may be configured to implement functionality for processing the received bitstream 112.

Figure 3:
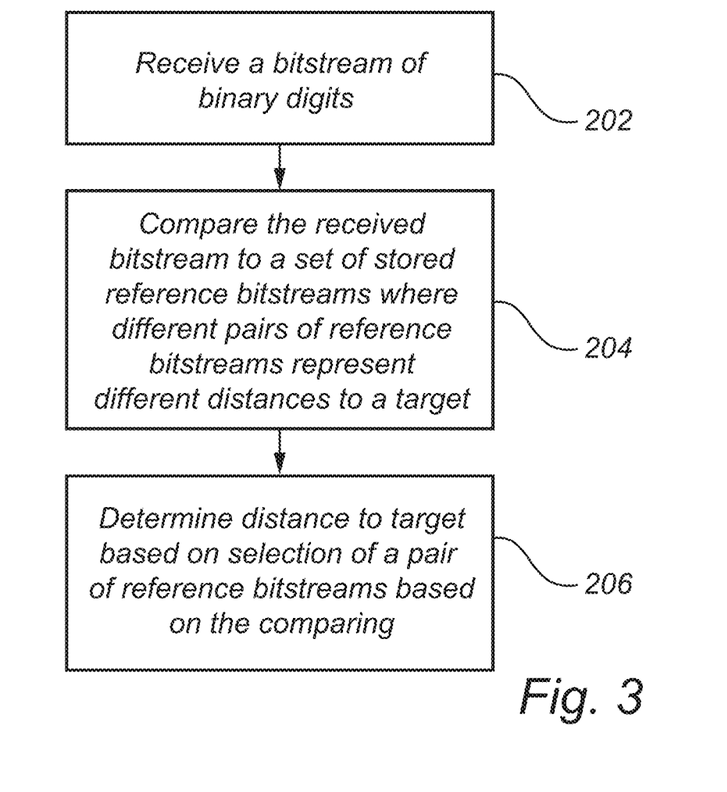
FIG. 3 is a flow chart of a method for determining a distance to a target according to an embodiment.

Referring now to FIG. 3, a method for determining the distance to the target 10 will be briefly summarized. Determination of the distance to the target 10 has already been described above in relation to the device 100, already indicating the method for determining the distance to the target 10. In addition, a brief summary of the method is presented below.

The method for determining the distance to the target comprises receiving 202 a bitstream 112 of binary digits. The bitstream 112 may represent a variation in time of a time-varying signal, wherein the time-varying signal is based on light transmitted by a light source 102 being reflected by the target 10. For instance, the light transmitted by the light source 102 may be mixed with light reflected by the target 10 using FMCW Lidar, such that the time-varying signal may comprise a beat frequency corresponding to a difference in frequency between the light transmitted by the light source 102 and the reflected light. The beat frequency may be dependent on the distance to the target 10. Each binary digit in the bitstream 112 is defined based on the time-varying signal at a time instance represented by the binary digit being above or below a threshold.

The method further comprises comparing 204 the bitstream 112 of binary digits to a set of stored reference bitstreams 114 of binary digits, wherein each reference bitstream 114 represents a distance to the target and wherein the set of stored reference bitstreams 114 comprise pairs of reference bitstreams 114 comprising a first reference bitstream 114a and a second reference bitstream 114b representing a common distance to the target. Each reference bitstream 114 may represent a waveform corresponding to the beat frequency associated with the distance to the target 10. The first reference bitstream 114a and the second reference bitstream 114b of a pair are phase-shifted in relation to each other while representing a waveform corresponding to a common beat frequency.

The method further comprises determining 206 the distance to the target based on selection of a pair of reference bitstreams 114 in the set of stored reference bitstreams 114 based on said comparing.

Thus, the comparing of the received bitstream 112 to the reference bitstreams 114 may allow identifying of a pair of reference bitstreams 114 matching the received bitstream 112. This pair of reference bitstreams 114 may then be selected and the distance to the target 10 may be determined as the distance with which the pair of reference bitstreams 114 is associated.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for determining a distance to a target, said method comprising:
    receiving a bitstream of binary digits corresponding to a variation in time of a time-varying signal based on light transmitted by a light source being reflected by the target, wherein each binary digit in the bitstream is defined based on the time-varying signal at a time instance represented by the binary digit being above or below a threshold;
    comparing the bitstream of binary digits to a set of stored reference bitstreams of binary digits, wherein each reference bitstream represents a distance to the target and wherein the set of stored reference bitstreams comprise pairs of reference bitstreams comprising a first reference bitstream and a second reference bitstream representing a common distance to the target, wherein the first reference bitstream is phase-shifted in relation to the second reference bitstream; and
    determining the distance to the target based on selection of a pair of reference bitstreams among the pairs of reference bitstreams based on said comparing,
    wherein comparing the bitstream of binary digits to a set of stored reference bitstreams of binary digits comprises determining a matching value for each stored reference bitstream based on bit-wise comparison, wherein the matching value represents similarity between the bitstream of binary digits and the stored reference bitstream, and wherein the bit-wise comparison comprises comparing the binary digits of the bitstream and the stored reference bitstream at corresponding positions and increasing the matching value when the binary digits are equal.

2. The method according to claim 1, further comprising detecting light transmitted by the light source being reflected by the target to form a detected signal and comparing the detected signal to a threshold for converting the detected signal to a binary digit.

3. The method according to claim 2, wherein light being reflected by the target is mixed with light transmitted by the light source to form a mixed light signal and wherein detecting light comprises detecting the mixed light signal.

4. The method according to claim 3, wherein the light transmitted by the light source is a frequency modulated continuous wave, FMCW, signal comprising chirps during which frequency of the FMCW signal is increased.

5. The method according to claim 2, wherein an output from comparing the detected signal to the threshold is periodically sampled for forming the bitstream of binary digits.

6. The method according to claim 1, wherein the comparing the bitstream of binary digits to a set of stored reference bitstreams comprises parallel processing of the comparing of the bitstream of binary digits to each of the stored reference bitstreams.

7. The method according to claim 1, wherein, for each stored reference bitstream, determining the matching value comprises determining a first partial matching value to the bitstream of binary digits based on a first light signal transmitted by a light source being reflected by the target using said bit-wise comparison, storing the first partial matching value, determining a second partial matching value to the bitstream of binary digits based on a second light signal transmitted by a light source being reflected by the target using said bit-wise comparison, and accumulating the first partial matching value with the second partial matching value to form the matching value.

8. The method according to claim 7, wherein the first partial matching value is accumulated with the second partial matching value using a L1 norm.

9. The method according to claim 1, wherein determining the distance to the target comprises, for each pair of reference bitstreams, forming a magnitude value representing likelihood of the received bitstream of binary digits corresponding to the common distance to the target represented by the pair of reference bitstreams, wherein the magnitude value is formed based on the matching value for the first reference bitstream and the matching value for the second reference bitstream of the pair.

10. The method according to claim 9, wherein determining the distance to the target further comprises selecting a plurality of pairs of reference bitstreams having largest magnitude values and forming an interpolation based on the largest magnitude values to determine the distance to the target with an improved resolution.

11. The method according to claim 1, further comprising receiving a plurality of bitstreams of binary digits corresponding to spatially separate detections of light, wherein the plurality of bitstreams is processed in parallel.

12. A device for determining a distance to a target, said device comprising:
    a processor configured for:
        receiving a bitstream of binary digits corresponding to a variation in time of a time-varying signal based on light transmitted by a light source being reflected by the target, wherein each binary digit in the bitstream is defined based on the time-varying signal at a time instance represented by the binary digit being above or below a threshold;
        comparing the bitstream of binary digits to a set of stored reference bitstreams of binary digits, wherein each reference bitstream represents a distance to the target and wherein the set of stored reference bitstreams comprise pairs of reference bitstreams comprising a first reference bitstream and a second reference bitstream representing a common distance to the target, wherein the first reference bitstream is phase-shifted in relation to the second reference bitstream; and
        determining the distance to the target based on selection of a pair of reference bitstreams among the pairs of reference bitstreams based on said comparing,
        wherein the comparing the bitstream of binary digits to a set of stored reference bitstreams of binary digits comprises determining a matching value for each stored reference bitstream based on bit-wise comparison, wherein the matching value represents similarity between the bitstream of binary digits and the stored reference bitstream, and wherein the bit-wise comparison comprises comparing the binary digits of the bitstream and the stored reference bitstream at corresponding positions and increasing the matching value when the binary digits are equal.

13. The device according to claim 12, further comprising:
a light source for transmitting light towards the target;
a mixer for mixing light reflected by the target and light transmitted by the light source for forming a mixed light signal;
a detector for detecting the mixed light signal; and
a comparator for comparing output from the detector to a threshold for converting output from the detector to a binary digit.

14. The device according to claim 13, further comprising a controller for controlling timing of the processor in relation to timing of a signal transmitted by the light source.

* * * * *